April 1, 1941.  P. TISON  2,236,767
MEANS FOR SLATING AND SYNCHRONIZING IN MOTION PICTURES
Filed Sept. 7, 1937   3 Sheets-Sheet 1

INVENTOR.
Percy Tison
BY
ATTORNEY.

April 1, 1941.　　　P. TISON　　　2,236,767
MEANS FOR SLATING AND SYNCHRONIZING IN MOTION PICTURES
Filed Sept. 7, 1937　　　3 Sheets-Sheet 2
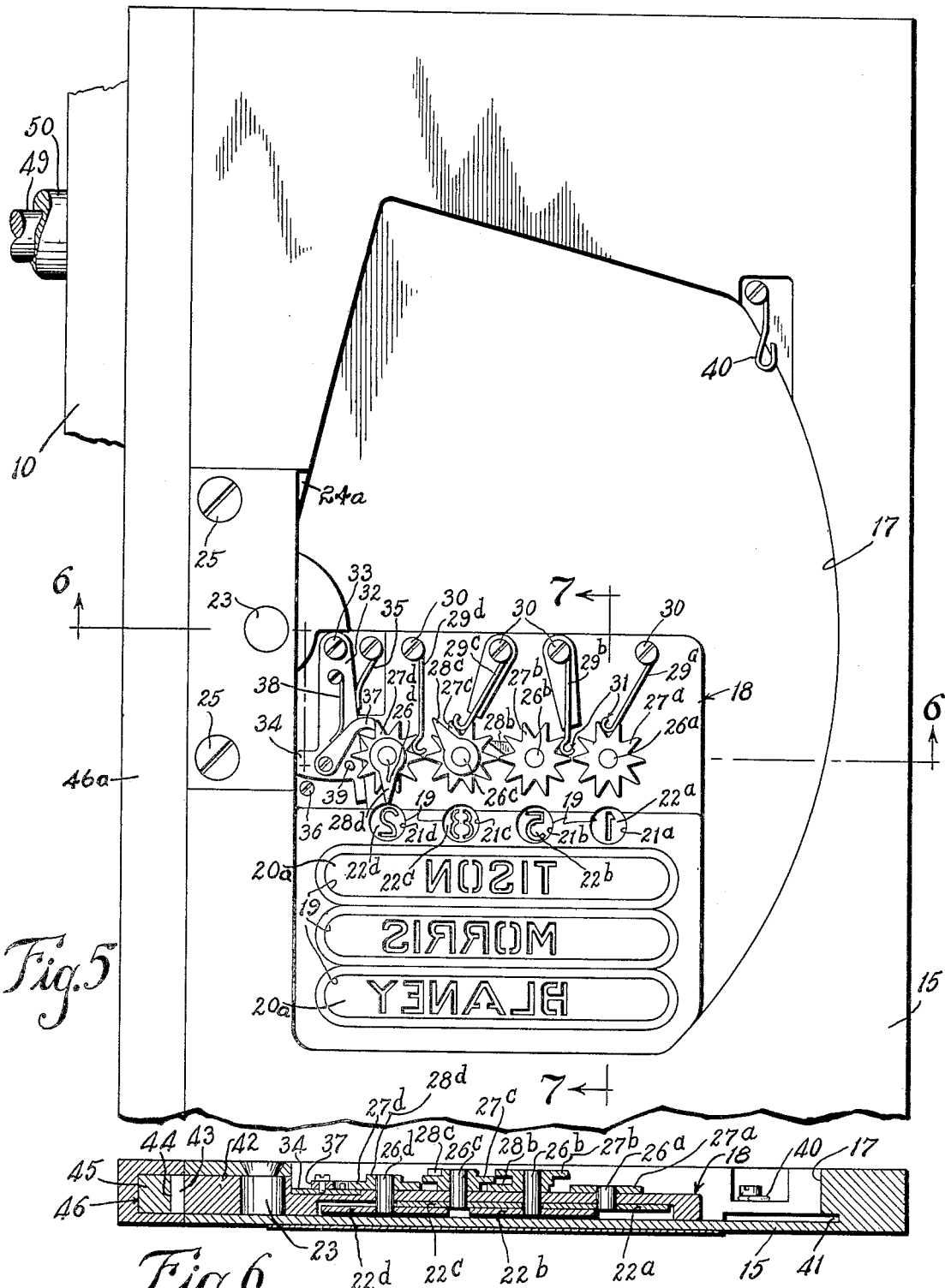
INVENTOR.
Percy Tison
BY
ATTORNEY.

April 1, 1941. P. TISON 2,236,767
MEANS FOR SLATING AND SYNCHRONIZING IN MOTION PICTURES
Filed Sept. 7, 1937 3 Sheets-Sheet 3

INVENTOR.
Percy Tison
BY
ATTORNEY.

Patented Apr. 1, 1941

2,236,767

UNITED STATES PATENT OFFICE 2,236,767

MEANS FOR SLATING AND SYNCHRONIZING IN MOTION PICTURES

Percy Tison, Westwood, Calif.

Application September 7, 1937, Serial No. 162,611

7 Claims. (Cl. 88—16)

The present invention relates to the art of motion pictures, and particularly to that branch which is concerned with the application of reference data on photographic and sound films so that they may be subsequently correlated by the cutter.

In the usual system of establishing synchronization between sound and photographic film, visual reference marks are placed on the respective negatives in order to enable the cutter to properly relate the films in the "dubbing" process. One method of obtaining such marks consists of slapping two sticks together to provide a synchronizing point on the sound track of the sound film, while simultaneously photographing the movement of the sticks toward each other on the camera film. The indication of the sound track would be related with the first camera frame showing the sticks in contact in order to synchronize the films in the printing operation. This procedure involves a margin of error, and in some instances cannot be used at all, as in situations necessitating the wide separation of the camera and the sound recorder. It is also essential that the camera and sound recorder mechanisms be brought up to normal operating speeds before the clap sticks are used. Various other visual-auditory synchronizing procedures are used but these are attended with the same disadvantages as the "clap stick" method referred to.

Before recording each scene, it is given a reference or "take number" which it is desirable to photograph on the camera film. The usual procedure consists in providing the take number, and other essential information such as the names of the director, cameraman, and sound operator, on a slate, and having an assistant cameraman hold the slate a proper distance in front of the camera. This procedure results in the disadvantageous use of film not only in recording the slate data but also in bringing the camera up to speed and in recording the "clap stick" action.

A further disadvantage of the present manner of slating resides in the small size of the slate appearing on each frame, rendering the information on the film difficult for the cutter to read. Such difficulty is enhanced by indistinctness of the slate data caused by improper focusing of the camera. This latter objection could be overcome by proper focusing of the lenses, but as will be readily appreciated such operations cause considerable delay in the production of the picture.

Additionally, when two or more cameras are being used to film the scene the slate holder must change the information on the slate to correspond with the particular camera photographing that information. Again delay is encountered, retarding the production of the picture during the time that the slate is being photographed. Not only is time lost during the slating operation, but the necessity for holding the slate near the actors interrupts their concentration on their lines and subsequent action.

Accordingly, it becomes an object of this invention to provide an improved apparatus for establishing synchronization between sound and photographic film.

It is a further object of this invention to decrease the number of operations essential to the establishment of synchronization between sound and photographic films.

Still another object of the invention resides in providing greater accuracy with practically no possibility of error in synchronizing sound and photographic film.

A further object of the invention lies in recording "take numbers" or other data without regard to the focal length of the camera lens.

Another object of the invention is to provide a device which will print a series of numbers and names on the sensitized surface of film regardless of the focal length of the lens, or without using a lens.

Still another object of the invention is to embody the slate in the camera or sound recorder or both and utilize light passing thru the slate to effect a print of the slate data on the film.

A further object of the invention is to eliminate interference between the actions of the persons or scene being photographed and the recording of take numbers.

Yet a further object of the invention is to effect a saving of films by accomplishing slating while the camera is coming up to operating speed before actually photographing the action.

Another object of the invention is to materially increase the size of the slate data printed on the film.

This invention possesses many other advantages and has other objects which may be made more easily apparent from a consideration of one form thereof shown in the accompanying drawings forming part of the present specifications. This form is hereinafter described in detail and illustrates the general principles of the invention; but it is to be understood that this description is not to be taken in a limiting sense, since the scope of the invention is best defined in the appended claims.

Fig. 5 illustrates the slating device looking towards the back of the camera and as seen along the line 5—5 of Fig. 2.

Fig. 6 is a cross sectional view taken along the line 6—6 of Fig. 5.

Figure 1:
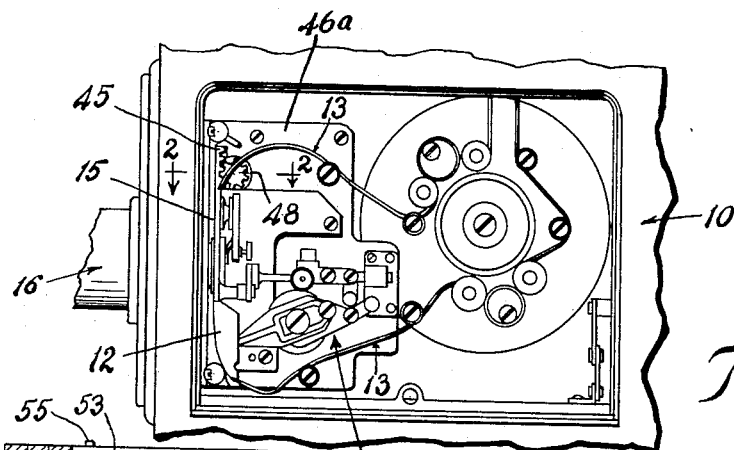
Fig. 1 is a side view of a motion picture camera embodying the mechanism of the instant invention, with the cover of the camera being lowered to disclose the interior mechanism thereof.
Figure 2:
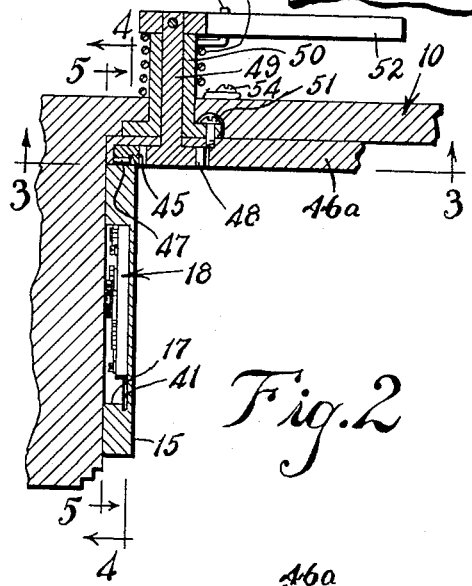
Fig. 2 is a transverse sectional view of the slating mechanism in the camera taken along the line 2—2 of Fig. 1.
Figure 3:
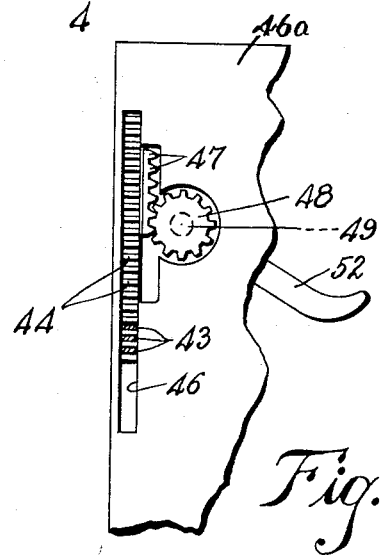
Fig. 3 is a view of the lever operating mechanism taken along the line 3—3 of Fig. 2.
Figure 4:
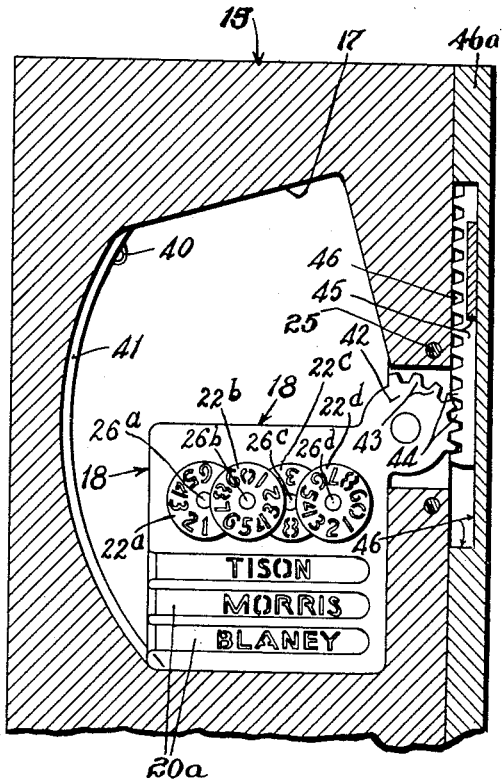
Fig. 4 is a view of the slating mechanism looking towards the front of the camera and as seen along the line 4—4 of Fig. 2.

The device used in recording the take numbers and other information is built into a camera 10 of a known construction, and includes the usual operating mechanism in the nature of an eccentrically operated, intermittent film feeding device 11 having a pull down lever or claw 12 for engaging in perforations in the film 13 to effect registration of each frame before the aperture 14 provided in the aperture plate 15 of the camera. The usual lens parts 16 are shown at the front of the camera for bringing the scene to proper focus on the sensitized surface of the film.

A recess 17 is provided in the aperture plate for reception of the major portion of the automatic slating mechanism. Such mechanism includes a mounting plate 18 having a plurality of openings 19 therethrough. The lower openings have dove-tailed recesses 20, in which are slidably carried strips 20a, having perforated therein information such as the respective names of the director, cameraman, and sound operator. The upper, circular openings 21d, 21c, 21b, 21a have the numbers of a counter registrable therewith, such numbers being perforated in the dials 22d, 22c, 22b, 22a of the counter and being automatically changeable by moving the mounting plate in a manner to be hereinafter described.

The mounting plate is pivotally supported on a fulcrum pin 23 fastened to a support 24, the support being held in a recess 24a of the aperture plate by the screws 25. The pivotal support permits the mounting plate to be swung into and out of registry with the aperture 14. This same pivotal motion also initiates automatic change in the counter numbers.

The counter is carried on the upper part of the mounting plate and includes the aforementioned perforated dials arranged in staggered relationship with respect to one another. The dials 22d, 22c, 22b, 22a are fixed to one end of the respective stub shafts 26d, 26c, 26b, 26a, rotatably supported in the plate and extending therethrough. On the other ends of the shafts are fixed respective ratchet wheels 27d, 27c, 27b, 27a; there being dogs 28d, 28c, and 28b integral with the respective ratchet wheels 27d, 27c and 27b. Ratchet 27d indicates units, ratchet 27c tens, ratchet 27b hundreds, and ratchet 27a thousands. Thus, as ratchet 27d completes one revolution (or ten units) its dog 28d will strike against a tooth of the adjacent ratchet 27c and move it a distance of one tooth space, or one tenth of a revolution. Similarly, a complete revolution of the tens ratchet will cause its dog 28c to strike against the adjoining teeth of ratchet 27b to move it a distance of one tooth space, or one tenth of a revolution. Further, one complete revolution of the hundreds ratchet 27b will move the adjoining thousands ratchet 27a a tenth of a revolution through the instrumentality of its dog 28b. The motion of each ratchet by one tooth space will correspondingly position different dial numbers before the circular plate openings, and to insure proper registration, overthrow of each dial and ratchet is prevented by the holding pawls 29d, 29c, 29b, 29a, each being in the form of a leaf spring fixed at one end to the mounting plate by a screw 30 and having a curved nose 31 for engagement between the ratchet teeth.

As stated above, motion of the mounting plate automatically operates the counter. To this end, a lever 32 is pivoted to the plate by the fulcrum pin 33 and has formed at its lower end a nose 34 for engagement with the side wall of the recess 17, which action will urge the lever in one direction about its fulcrum pin. Its motion in the other direction is produced by the return spring 35 fixed to the plate and having one end bearing against the lever. The return movement of the lever under the influence of the spring is limited by the stop 36 against which the lower end of the lever is urged.

A power pawl 37 is pivoted to the lever and is urged into ratchet engaging position by the leaf spring 38 fixed at one end to the lever and engaging against a surface of the pawl. The extent of movement of the pawl under the influence of its spring is limited by the pin stop 39 fixed on the lever.

Upon movement of the mounting plate downwardly to aperture registering position, the nose on the lever 32 will strike against the side wall of the recess 17 at a point below the pivot support 24, and oscillate the lever about its fulcrum. This will cause the pawl to engage with a tooth of the units ratchet 27d and move it a distance of one tooth space to effect a change in the take number. Upward movement of the mounting plate will permit the return spring to move the lever back against its limit stop and in so doing position the power pawl 37 against a face of a succeeding tooth of the units ratchet 27d whereupon another complete depression of the plate will cause the lever and pawl to move the units ratchet another tooth space.

It will be noted that a detent 40 in the form of a spring is provided to maintain the plate in its normal raised position free from the aperture. This plate is guided not only by the fulcrum support but also by a groove or shoulder 41 formed in the aperture plate. By this device, smooth motion of the mounting plate in a single plane is insured.

To oscillate the mounting plate and effect aperture registry and automatic take number change, the mounting plate has formed integrally therewith, or otherwise fixed thereto, a gear sector 42, the teeth 43 of which are in engagement with one set of teeth 44 of a rack 45 slidably supported in a grooved guideway 46 adjacent the aperture plate, said guideway being formed in a mounting plate 46a carrying the film feeding mechanism 11. On another one of its faces the rack has a second set of teeth 47 engaging with a pinion 48, preferably formed integrally with a shaft 49 journalled in the bearing 50 fixed to the plate 46a by the screws 51. The shaft 49 extends to the outside of the camera case and has affixed to its outer end a lever 52. The lever is maintained in a normal upward position by the coil spring 53, one end of which is fixed to the camera frame by the screw 54 and the other end 55 bearing against the lever.

Depression of the lever will produce a raising of the rack, which, in turn, will swing the mounting plate 18 carrying the automatic slating counter into registry with the camera aperture and effect a change in the dial position, as heretofore described. Release of the lever will permit the mounting plate to be moved out of aperture registry to its extreme upward position under the influence of the coil spring 53 where it will be held by the spring detent 40. In this holding function, the detent will be aided by the coil spring.

For the purpose of photographing the automatic slate, the film 13 moves past the aperture 14 in very close proximity to the information contained on the slate. Light from the outside of the camera enters thru the perforated numbers and letters to cause a reaction on the sensitized surface of the film and thereby record thereon the desired data. It will be noted that the information thus recorded will cover substantially the entire area of each frame on the film. By virtue of this greater area, an increased legibility to the cutter is established over that obtainable by photographing a slate held in front of the camera.

Figures 7, 8:
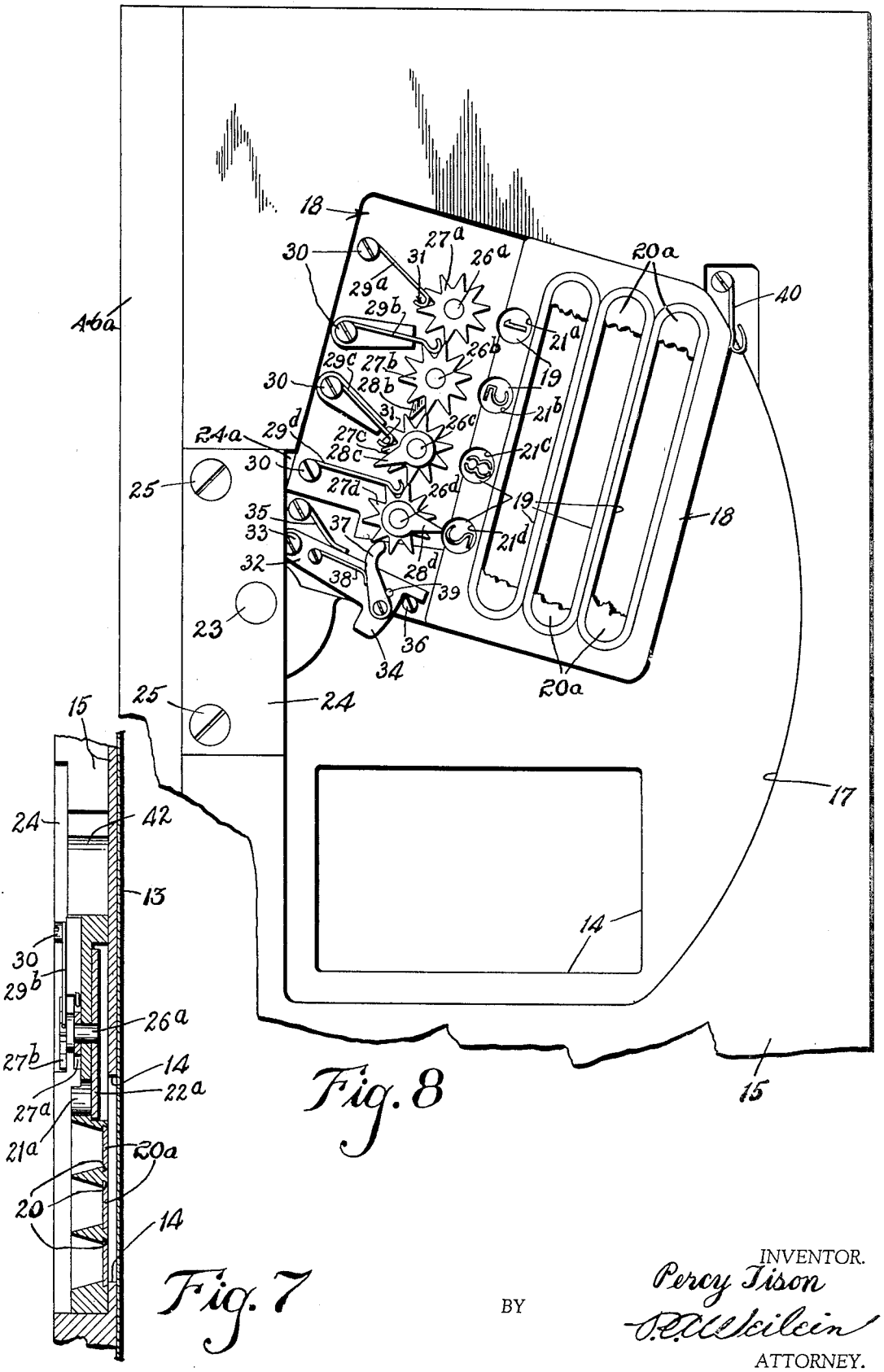
Fig. 7 is a sectional view taken along the line 7—7 of Fig. 5.
Fig. 8 is a view similar to Fig. 5, but illustrating the slating device in another position.

It will also be obvious that the elimination of the need for a slate holder overcomes the objection of mingling with the actors during the slating operation. Further, the proper focusing of the subject on the slate is not dependent upon the position of the lens, since all that is required is for light to pass thru the numbers or letters on the slate. For that matter, no lens whatever is essential because of the juxtaposition of the film and slate, which are only slightly separated, as will be appreciated from a consideration of Fig. 7.

At the beginning of taking each scene, each cameraman will depress the lever 52 and start his camera motor. While the camera is coming up to speed the information on the automatic slate will be recorded, after which the lever can be released so as to remove the slate from the vicinity of the aperture, whereupon the particular scene desired can be photographed without any delay caused by the need for an assistant cameraman to move out of the camera range, and by the need of altering the information on the plate for each camera that is being used. In addition to the time being saved in this manner, the amount of film used is decreased since the footage required to bring the camera up to normal operating speed is usually lost in any event. Additionally, synchronizing points can be definitely established by making use of the slate information and without the necessity of slapping sticks together.

By photographing the same slate information on the sound film, positive synchronization with the photographic film can be insured. The same automatic slating mechanism can readily be incorporated into the sound recorder, the relationship of the parts being substantially the same as in the device shown in the drawings. The only difference in substance would include a mechanism for feeding the film continuously past an aperture through which light of varying intensity would be passed to trace a sound track on a marginal edge of the sound film in a well known manner. An additional aperture similar to the aperture 14 of the camera would be required in the sound recorder across which the slating mechanism could be positioned. When in such position, an auxiliary light source would be energized for passing light rays thru the slate perforations and additional aperture for producing a print on the film. It is to be understood that the sound film would be stationary during the slating operation. It should further be understood that light other than that from the auxiliary source would normally be excluded from passing thru the slating aperture onto the sensitized surface of the film. Thus, the information recorded on the sound film could be made to agree precisely with that on the photographic film. That is, the single picture obtained on the sound film when correlated with the first slated frame on the photographic film would apprise the cutter of the points of synchronization of the respective films.

One specific method of accomplishing the synchronization would include slating on the sound film while both the recorder and camera are stationary. Subsequently, the two machines would be operated in synchronism while the slating information was being recorded on the photographic film. This would not result in waste of sound film since it is essential to bring it up to normal operating speed together with the photographic film before the action is recorded. In the "dubbing" process the cutter would relate the slated picture on the sound film with the first slated frame on the photographic film to obtain a proper composite print of the sound and picture action.

It will thus be seen that my method of establishing synchronizing points on the sound and picture film can effect a considerable saving in both the amount of film used and in time. As before mentioned, the slating information and the synchronizing points are obtainable with clearness and precision while the film is being brought up to normal operating speed, this film being lost in any event. Additional film is not used as in the methods presently in use. That is, after normal operating speed is established, additional film is not needed for slating, and then recording the clap stick operation to establish synchronizing points.

While I have described my invention with particular reference to the mechanism shown on the drawings, it is to be understood that such disclosure is designed primarily for illustrative purposes only, and that various changes may be made in the construction and arrangement of the parts without departing from the invention as defined in the claims appended hereto.

I claim:

1. In combination, a camera having an aperture through which light is adapted to pass, a plate, indicating means on said plate including a mechanical counter mechanism, means for positioning said indicating means across said aperture, and means for simultaneously actuating said counter mechanism during movement of said indicating means to aperture registering position whereby to change the counter reading.

2. In combination, a camera having an aperture through which light is adapted to pass, a plate pivotally mounted in the camera, indicating means including a counter mechanism on said plate, means for moving said plate about its pivot to register the indicating means with the aperture, and means operated upon movement of said plate for effecting a change in the reading of the counter mechanism.

3. In combination, a camera having an aperture through which light is adapted to pass, a plate pivotally mounted in the camera, indicating means including a counter mechanism on said plate, means for moving said plate about its pivot to register the indicating means with the aperture, a lever pivoted to the plate, a pawl on the lever, and stationary means engageable with the lever upon motion of the plate to cause said pawl to engage the counter mechanism and effect a change in its reading.

4. In combination, a camera having an aperture through which light is adapted to pass, a plate pivotally mounted in the camera, indicating means including a counter mechanism on said plate, means for moving said plate about its pivot to register the indicating mechanism with the aperture, means for holding said plate out of registry with said aperture, and means operated upon movement of said plate for effecting a change in the reading of the counter mechanism.

5. In combination, a camera having an aperture; a plate movably mounted in the camera, said plate having a plurality of openings therethrough; indicating means including a plurality of dials mounted on the plate, there being a series of perforated numbers on the outer margin of each dial, the numbers of each dial being adapted for registration with an individual opening; and means for selectively positioning said registered numbers across said aperture; whereby light can pass through said openings, perforations and aperture.

6. In combination, a motion picture camera having a framing aperture through which light is adapted to pass, means having indicia thereon, means for moving said means to and from a position across said framing aperture, and means changing the indicia in response to movement of said first mentioned means.

7. In combination, a camera having an aperture through which light is adapted to pass, a plate, means mounting said plate for movement, indicating means including a mechanical counter-mechanism on said plate, means moving said plate to position said indicating means across said aperture, and means responsive to motion of said plate for automatically actuating said counter to effect a change in its reading.

PERCY TISON.